US005251115A

United States Patent [19]
Hillman et al.

[11] Patent Number: 5,251,115
[45] Date of Patent: Oct. 5, 1993

[54] SPECIFIC INTENSITY DISTRIBUTION LIGHT REFLECTOR

[75] Inventors: Lloyd W. Hillman, Huntsville; William H. Parsons, 4205 Kennesaw Dr., Birmingham, Ala. 35213

[73] Assignee: William H. Parsons, Birmingham, Ala.

[21] Appl. No.: 883,880

[22] Filed: May 15, 1992

[51] Int. Cl.$^5$ ............................................. F21V 7/12
[52] U.S. Cl. ............................... 362/296; 362/346; 362/16
[58] Field of Search ............... 362/296, 346, 16, 217, 362/260

[56] References Cited
U.S. PATENT DOCUMENTS

| | | |
|---|---|---|
| 4,300,831 | 11/1981 | Isago ........................................ 362/16 |
| 4,412,276 | 10/1983 | Blinow ..................................... 362/16 |
| 4,719,493 | 1/1988 | Maiorano ................................. 362/16 |
| 5,051,878 | 9/1991 | Ngai ........................................ 362/346 |
| 5,065,294 | 11/1991 | Poot, Jr. ................................. 362/346 |
| 5,134,558 | 7/1992 | Williams et al. ....................... 362/346 |

Primary Examiner—Richard R. Cole
Attorney, Agent, or Firm—Dann, Dorfman, Herrell and Skillman

[57] ABSTRACT

A reflector for modifying the light intensity distribution patterns of a cylindrical light source has a first reflecting surface formed to provide a desired light intensity distribution pattern in the vertical plane and at least one other reflecting surface extending from one end of the first reflecting surface and which is oriented and formed to provide a second desired light intensity distribution pattern in the horizontal plane.

16 Claims, 6 Drawing Sheets

SPECIFIC INTENSITY DISTRIBUTION LIGHT REFLECTOR

BACKGROUND OF THE INVENTION

This invention relates to light reflectors and in particular to a reflector system which when used in connection with an elongated light source modifies the light intensity distribution pattern of the light source to conform to a desired pattern.

A high intensity tubular shaped lamp has characteristic light intensity distribution patterns. In particular the pattern in the vertical direction, i.e., in a plane that is perpendicular to the long axis of the lamp, is constant with respect to the angle of rotation in the plane. However, the pattern in the horizontal direction, i.e., in a plane that is parallel to the long axis of the lamp, varies with the angle of rotation in that plane in accordance with the relationship:

$$I(\phi) = I_0 \cos(\phi) \qquad \text{Eq. (1).}$$

It is difficult, if not impossible, to increase the horizontal light distribution pattern near the ends of such a lamp ($\phi = 90°$) solely by use of a refractive lens.

Such high intensity lamps are used in visual warning systems, a particular example being smoke alarms for persons with impaired hearing. Those units include a high intensity flash lamp to provide a visual alarm. Recent requirements for the light intensity distribution pattern in the horizontal direction, also known as the horizontal roll-off characteristic, for such devices, have created a genuine need for an effective means to modify the horizontal roll-off characteristic of the flash lamp in order to meet the current specification.

SUMMARY OF THE INVENTION

In accordance with the present invention, a light reflector is provided for modifying the light intensity distribution from an elongated light source to match or exceed a desired or specified light intensity distribution pattern. The reflector according to this invention includes a first reflecting surface having first and second ends, a longitudinal axis parallel to the light source and a length that is shorter than the length of the light source. This first reflecting surface functions to modify the vertical and horizontal distribution patterns.

A second reflecting surface intersects the first surface at one end thereof and slopes away from said first surface at a predetermined angle relative to the longitudinal axis of said first surface. This second surface functions to modify the horizontal distribution pattern of the light source. Additional reflecting surfaces similar to the second surface can be included for a similar purpose.

The curvature and dimensions of the reflecting surfaces, and the slope angle of the second and/or third surfaces, are selected to provide vertical and horizontal intensity distribution patterns that match or exceed desired or specified intensity roll-off patterns in the vertical and horizontal planes, respectively.

BRIEF DESCRIPTION OF THE DRAWINGS

The foregoing summary, as well as the following detailed description of a preferred embodiment of the present invention, will be better understood when read in conjunction with the appended drawings, in which.

DETAILED DESCRIPTION OF THE INVENTION

Figure 1:
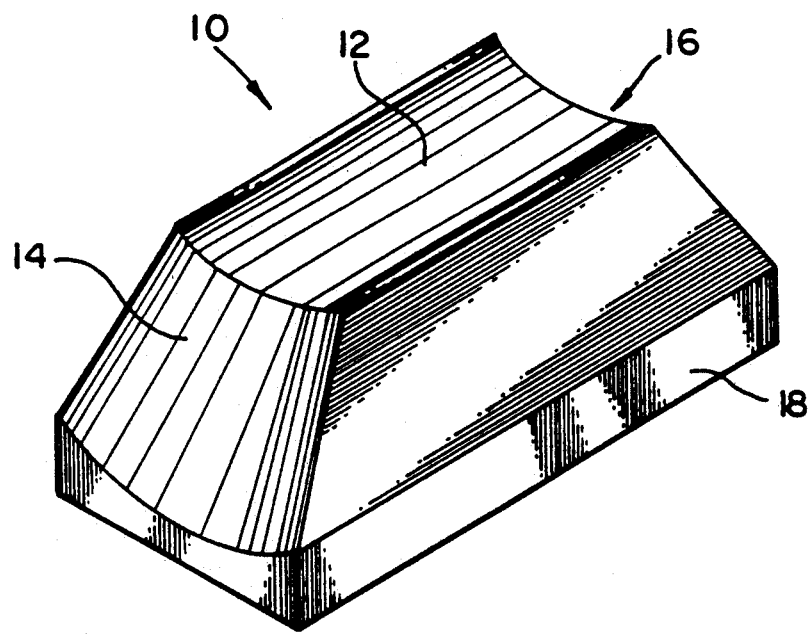
FIG. 1 is a perspective view showing a reflector in accordance with the present invention.

Referring now to the drawings and in particular to FIG. 1, there is shown a preferred embodiment of a reflector 10 in accordance with the present invention. The reflector 10 includes a first reflecting surface 12 which is disposed between a second reflecting surface 14 and a third reflecting surface 16. The reflecting surfaces 14 and 16 intersect with and extend from reflecting surface 12 at opposite ends thereof and slope away from reflecting surface 12 at a predetermined angle.

Reflecting surface 12 is preferably shaped in the form of a segment of a right circular cylinder, and better yet has an elliptical or parabolic curvature. Reflecting surface 12 functions to modify the vertical and horizontal light intensity roll-off patterns of a light source. Each of the reflecting surfaces 14 and 16 is generally in the shape of a segment of a right circular cone, and preferably the surfaces have an elliptical or parabolic curvature. The function of reflecting surfaces 14 and 16 is to modify the horizontal intensity roll-off pattern of the light source. While reflecting surfaces 14 and 16 also contribute to the vertical distribution pattern, as a practical matter, that contribution is relatively insignificant.

The reflecting surfaces 12, 14 and 16 are formed in or mounted on a base 18. In the embodiment shown in the drawings, the surfaces 12, 14 and 16 are formed in a solid block of material and are then coated with a highly reflective coating.

For a desired vertical roll-off characteristic, the curvature and eccentricity of reflecting surface 12 and the position of the lamp relative to surface 12 are selected. Furthermore, for a desired horizontal roll-off characteristic, the slope angle and curvature of the reflecting surfaces 14 and 16 are determined independently of reflecting surface 12. The following description of a preferred approach for determining the curvature, length, slope angle, and other parameters of the reflecting surfaces is presented in terms of a first order approximation for the shape and slope of the reflective surfaces 12, 14 and 16. Optimization of the reflective surfaces is accomplished by use of an optical design computer program. A preferred computer program for optimizing the design parameters of the reflecting surfaces 12, 14, and 16 is that sold under the registered trademark "CODE V" by Optical Research Associates of Rochester, N.Y.

Figure 2:
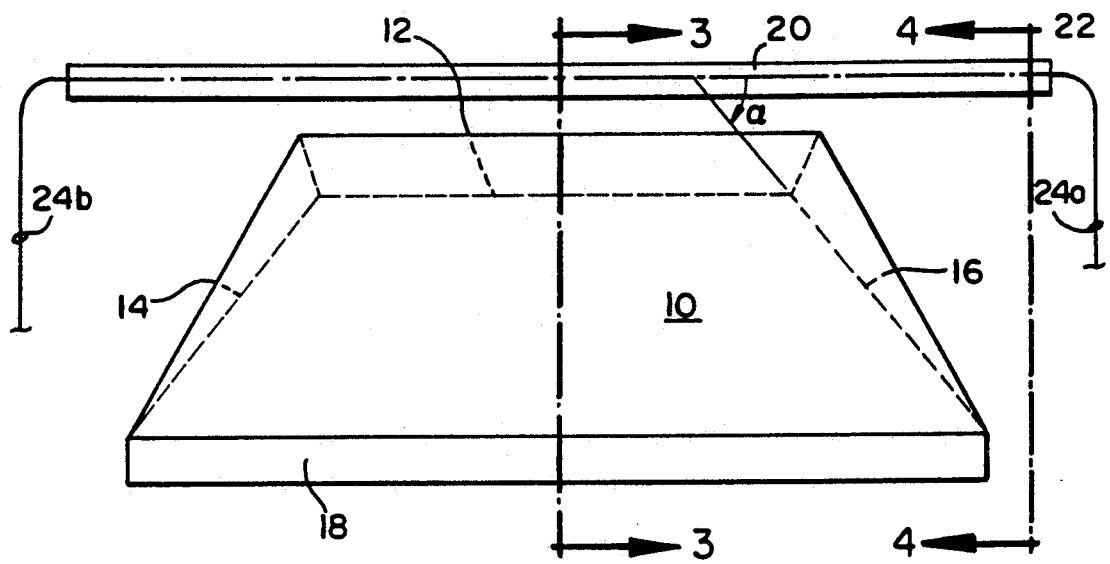
FIG. 2 is a side elevation view of a reflector in accordance with the present invention in combination with a tubular lamp.

As is generally known, for a Lambertian light source, the radiant intensity, i.e., the luminous flux per steradian, in a given direction is proportional to the solid angle extending from the light source multiplied by the square of the distance from the source. That relationship holds true whether the source is a luminous object such as a lamp, or the reflected image of the luminous object. Shown in FIG. 2 is a high intensity lamp 20 in combination with a reflector 10 according to the present invention. The lamp 20 is generally cylindrical or tubular in shape and has a longitudinal axis 22.

The light intensity distribution of lamp 20 does not vary with the angle of rotation, $\theta$, in the vertical plane because of the cylindrical geometry of the lamp. That phenomenon can be understood more clearly by reference to FIG. 3 or 4 which show the angle of rotation, $\theta$, in a vertical plane that bisects the lamp 20 and the reflector 10. At any radial distance from the lamp 20 the intensity of the light is constant with respect to the angle $\theta$. Furthermore, it will be readily appreciated that half of the light radiating from lamp 20 travels in a direction that is generally away from reflecting surface 12 of reflector 10. The other half of the light radiating from lamp 20 travels generally in the direction toward reflecting surface 12. Accordingly, the reflecting surface 12 is formed to redirect the light incident upon it in such a manner as to modify the light intensity distribution on the distal side of lamp 20 to meet a desired intensity distribution pattern or roll-off characteristic.

Figures 3, 4:
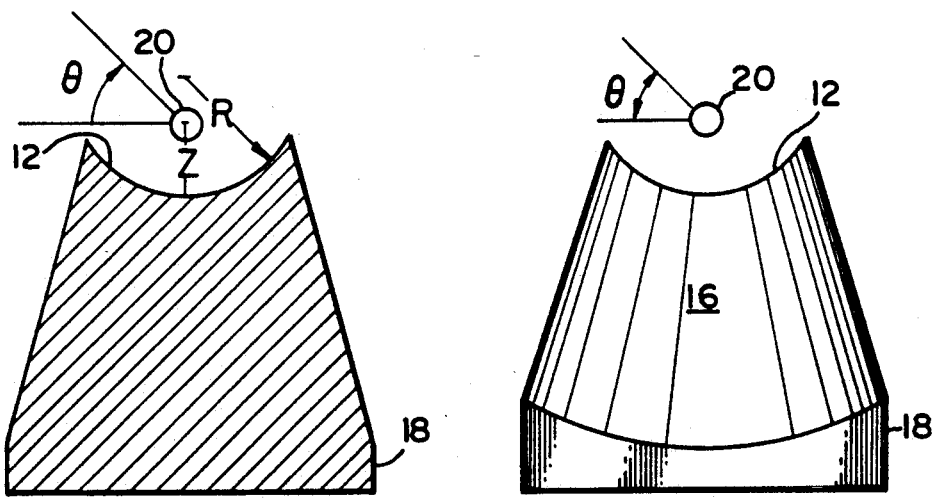
FIG. 3 is a cross-sectional view of the reflector of FIG. 2 as viewed along line 3—3.
FIG. 4 is an end view of the reflector shown in FIG. 2 as viewed along line 4—4.
Figure 5:
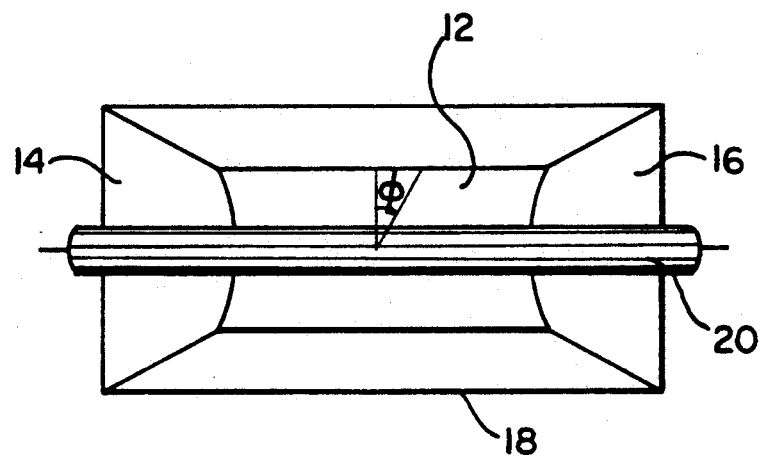
FIG. 5 is a top plan view of the reflector shown in FIG. 2.
Figure 6:
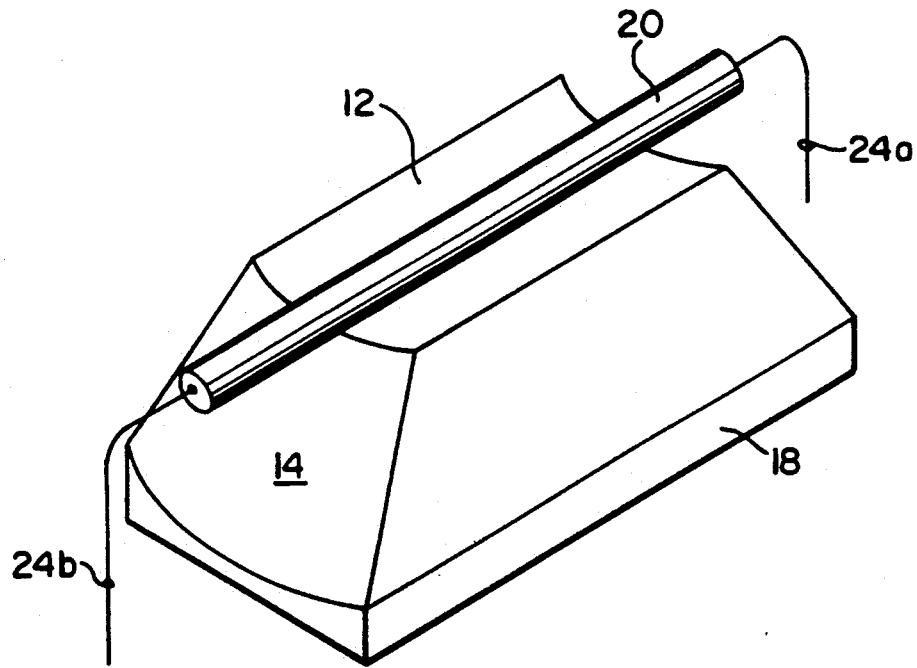
FIG. 6 is a top perspective view of the reflector shown in FIG. 2.

The length X of reflecting surface 12 and its curvature are dependent on the length L and diameter D of the lamp 20. FIG. 3 shows a cross-section of the reflective surface 12 of the reflector according to the present invention. The curved surface 12 has a radius R and the lamp 20 is positioned a distance Z from the reflective surface. The distance Z is greater than $\frac{1}{2}R$ but less than R. A first order analysis of the radiometry of the lamp-reflector system shows that the reflecting surface 12 adds to the light intensity distribution in the vertical direction according to the following relationship:

$$\Delta I_M(\theta) = \begin{cases} Q & \text{for } 0° \leq |\theta| \leq \theta_1 \\ Q \left( \frac{\theta_2 - |\theta|}{\theta_2 - \theta_1} \right) & \text{for } \theta_1 \leq |\theta| \leq \theta_2 \\ 0 & \text{for } \theta_2 \leq |\theta| \leq 90° \end{cases} \qquad \text{Eq. (2)}$$

where $Q = I_0 \cdot \frac{X}{D} \cdot \frac{\pi}{\theta_1 + \theta_2}$;

$$\tan\theta_1 = \left| \frac{\frac{1}{2}R \cdot Z \cdot \sqrt{R^2 - (R - Z)^2}}{Z - \frac{1}{2}R} - \frac{\frac{1}{2}D}{Z} \right|;$$

$$\tan\theta_2 = \left| \frac{\frac{1}{2}R \cdot Z \cdot \sqrt{R^2 - (R - Z)^2}}{Z - \frac{1}{2}R} + \frac{\frac{1}{2}D}{Z} \right|; \text{ and}$$

$I_0$ is the maximum or on-axis light intensity of the bare lamp 20. $\theta_1$, $\theta_2$, and $\theta_n$ are selected to correspond to transitions in light intensity in accordance with the desired vertical roll-off characteristic.

In an analogous manner, the reflecting surface 12 contributes to the horizontal light intensity distribution in accordance with the relationship:

$$\Delta I_M(\phi) = Q \cos(\phi) \qquad \text{Eq. (3)}.$$

The parameter Q is the same quantity given for Eq. (2) above.

The reflecting surfaces 14 and 16 function to intensify the light radiation near the ends of lamp 20, i.e., at angles greater than 45° from the transverse axis, in the horizontal plane. Such a horizontal plane is defined as being coincident with the longitudinal axis 22 of lamp 20 and parallel to a pair of straight lines on the reflecting surface 12 that are themselves parallel to and equidistant from the longitudinal axis 22 of lamp 20.

In a simple embodiment, each of the reflecting surfaces 14 and 16 are planar and angled at a 45° slope relative to the longitudinal axis 22 which is shown in FIG. 2 as the angle $\alpha$. In such a configuration, each reflecting surface 14 or 16 contributes an additional amount to the intensity distribution in the horizontal plane that is generally determined by the relationship:

$$\Delta I_E(\phi) = \frac{I_0}{2(L - X)} |\cos(\phi + 2\alpha)|. \qquad \text{Eq. (4)}$$

More specifically, the additional amount of intensity when $\alpha$ is about 45° in the horizontal plane is determined by the relationship:

$$\Delta I_E(\phi) = \frac{I_0}{2(L - X)} |\sin(\phi)|. \qquad \text{Eq. (4a)}$$

It is noted that Eqs. (4) and (4a) also provide useful first order approximations for determining the required length X of reflecting surface 12.

The light intensity provided by each of the reflecting surfaces 14 and 16 is further modified by adding curvature to those surfaces such that they are in the shape of a right circular cone segment. Higher order curvatures, such as an elliptical or parabolic curvature, are preferred to more closely match the desired horizontal roll-off characteristic. However, because of the complexity of the calculations involved for such higher order surfaces, the optical design computer program is used to optimize the conic angle and eccentricity of the surfaces 14 and 16. In a preferred embodiment the reflecting surfaces 14 and 16 are each segments of a right angle cone having a major axis coincident with the center of curvature of the reflective surface 12.

As an example of the present invention, it may be helpful to consider a lighting device which must meet or exceed horizontal and vertical roll-off characteristics as set forth in Tables 1A and 1B below. Shown in Table 1A are the specified light intensities as a percentage of the maximum intensity (%-Rating) for the various angular intervals ($\phi$-Deg.) about the transverse axis of a cylindrical or tubular lamp as shown in FIGS. 2-6. Shown in Table 1B are the specified light intensities for the various angular intervals about the longitudinal axis of the lamp.

TABLE 1A

| Horizontal Plane | |
|---|---|
| $\phi$-Deg | %-Rating |
| 0 | 100 |
| 5-25 | 90 |
| 30-45 | 75 |
| 50 | 55 |
| 55 | 45 |
| 60 | 40 |
| 65-70 | 35 |

TABLE 1A-continued

| Horizontal Plane | |
|---|---|
| φ-Deg | %-Rating |
| 75–80 | 30 |
| 85–90 | 25 |

TABLE 1B

| Vertical Plane | |
|---|---|
| θ-Deg | %-Rating |
| 0 | 100 |
| 5–30 | 90 |
| 35 | 65 |
| 40 | 46 |
| 45 | 34 |
| 50 | 27 |
| 55 | 22 |
| 60 | 18 |
| 65 | 16 |
| 70 | 15 |
| 75–90 | 12 |

Figure 7:
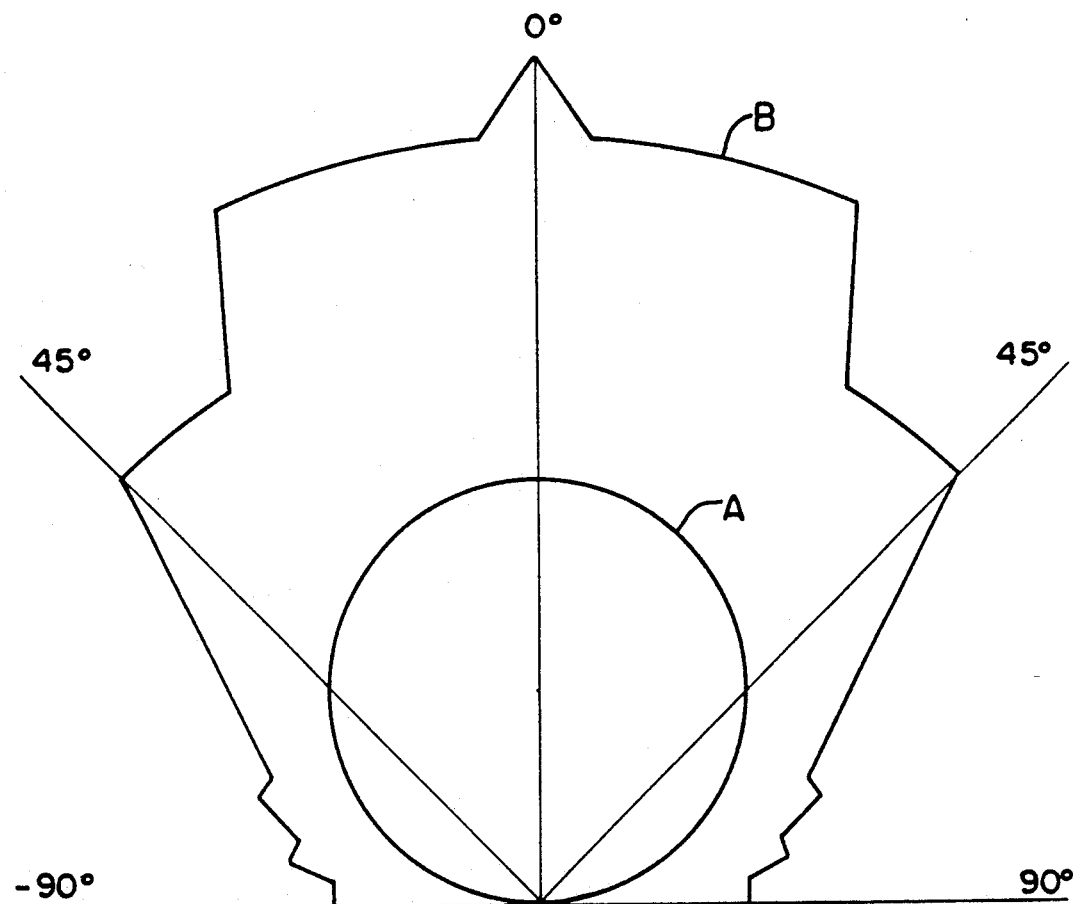
FIG. 7 is a polar graph of the horizontal light intensities of a light source alone and in combination with a reflector according to this invention.

Shown in FIG. 7 is a polar graph of the horizontal light intensity of the lamp 20 of FIGS. 2–6 alone (Curve A) together with a polar graph of the horizontal light intensity of lamp 20 in combination with the reflector 10 according to this invention (Curve B) which meets the horizontal roll-off specification of Table 1A.

Figure 8:
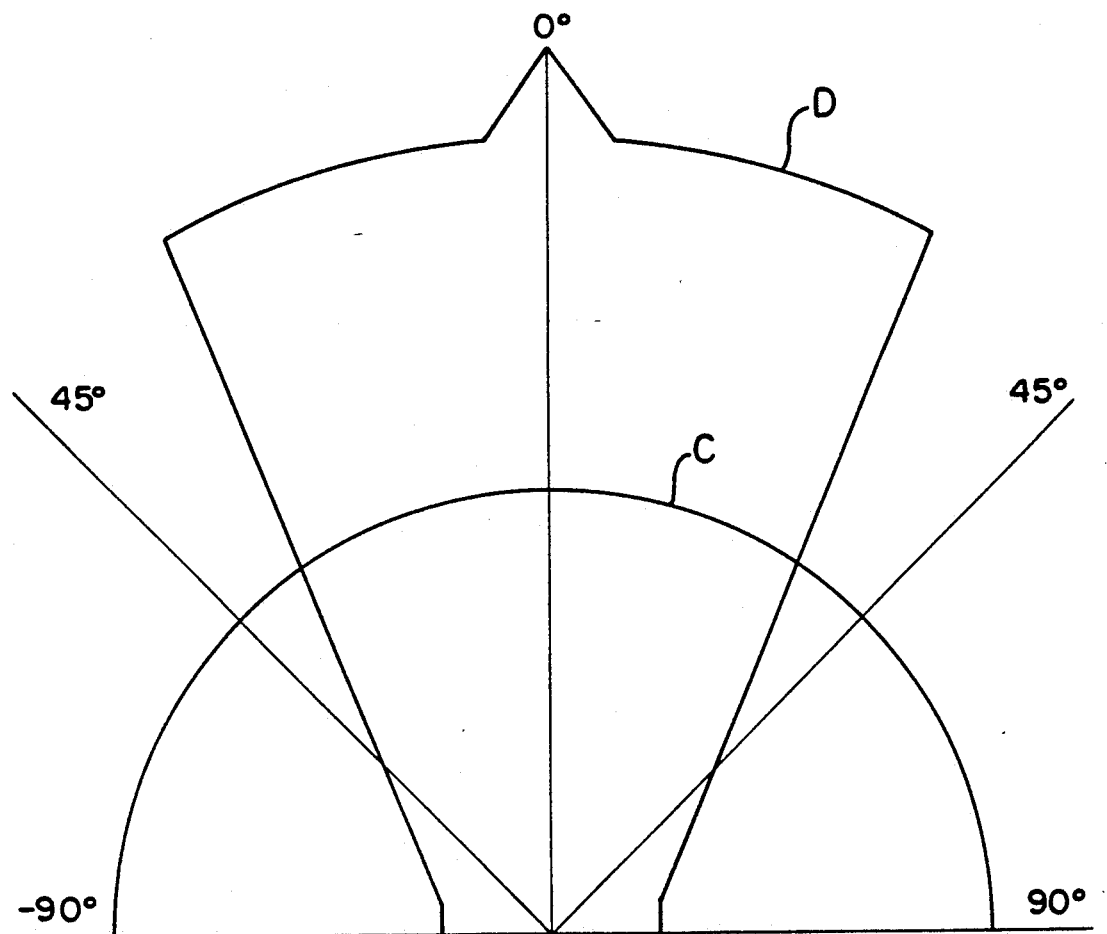
FIG. 8 is a polar graph of the vertical light intensities of a light source alone and in combination with a reflector according to this invention.

Shown in FIG. 8 is a polar graph of the vertical light intensity of lamp 20 of FIGS. 2–6 alone (Curve C) together with a polar graph of the vertical light intensity of lamp 20 in combination with the reflector according to this invention (Curve D) which meets the vertical roll-off specification of Table 1B. Note that above 35° the intensity of the bare lamp is sufficient to exceed the specification.

The reflector according to the present invention can be manufactured from a variety of materials including glass, fiberglass, plastic, or metal. The reflector can be formed by a variety of processes including injection molding, form rolling, or casting.

Figure 9:
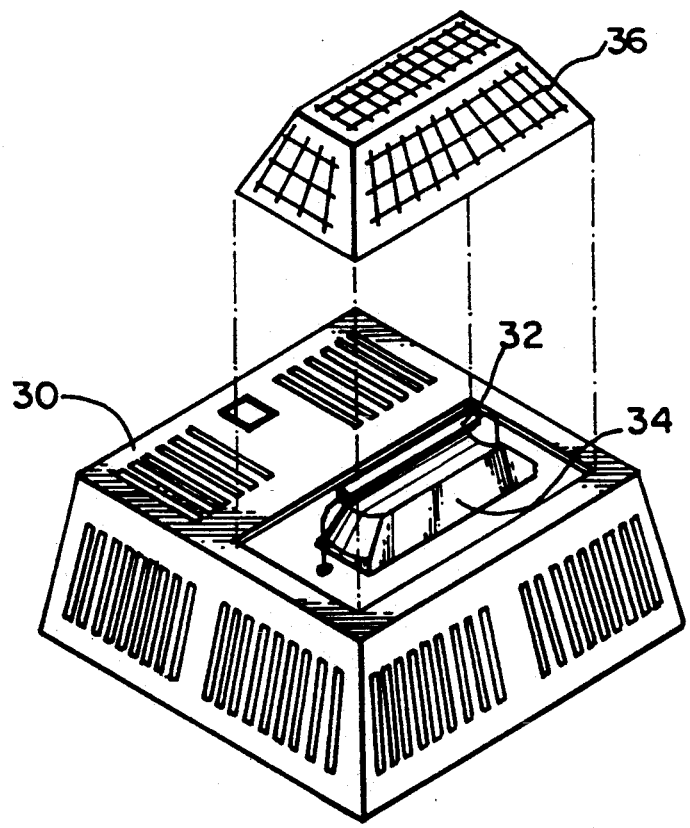
FIG. 9 is a perspective view of a smoke alarm having a reflector according to the present invention in combination with a high intensity lamp.

The reflector according to the present invention is useful in many applications involving control and reshaping of the intensity patterns of a tubular lamp. For example, this reflector is used in fire and smoke alarms for hearing-impaired persons. Shown in FIG. 9 is a smoke/fire alarm 30 which has a flash lamp 32 for providing a visual alarm in response to the detection of smoke or heat. Such a smoke/fire alarm is described in U.S. Pat. No. 5,019,805, which is incorporated herein by reference. A reflector 34 in accordance with the present invention is mounted on the smoke/fire alarm 30 adjacent the flash lamp 32 so as to modify the light intensity pattern radiating from the flash lamp 32 into a room. Additionally, a refractive lens 36 is mounted on the smoke/fire alarm 30 over the flash lamp 32 to further modify the light intensity pattern of the flash lamp 32.

The reflector according to this invention can also be used in a wide variety of lighting systems, including, but not limited to strobe light warning devices, sign lighting fixtures, automotive headlamps, flashlights, and interior lighting fixtures, to provide a desired light intensity distribution pattern for any of such devices. Moreover, it can be used with cylindrical lamps having other than straight-line geometry, e.g., a U-shaped lamp. To accommodate such other lamp shapes, the number of reflecting surfaces can be increased beyond those shown in the preferred embodiment. In certain applications it is preferable to configure the reflecting surfaces to gradually curve into each other in order to avoid a sharp transition between them.

It will be recognized by those skilled in the art that changes or modifications may be made to the above-described embodiment without departing from the broad inventive concepts of the invention. It is understood, therefore, that the invention is not limited to the particular embodiment which is described, but is intended to cover all modifications and changes which are within the scope and spirit of the invention as defined in the claims which follow.

What is claimed is:

1. A light reflector for providing a desired light intensity distribution from an elongated light source, said reflector comprising:
   a first reflecting surface having first and second ends, a longitudinal axis extending between said ends and parallel to the light source and a length along said axis and between said ends that is shorter than a total length of the light source; and
   a second reflecting surface which intersects said first surface at said first end thereof, said second surface sloping away from said first surface and said light source at a predetermined angle relative to the longitudinal axis of said first surface.

2. A light reflector as recited in claim 1 wherein said first reflecting surface is curved so as to form a cylindrical segment having a longitudinal axis that is parallel to the light source.

3. A light reflector as recited in claim 2 wherein said second reflecting surface is curved and tapered so as to form a conical segment which diverges as said second reflecting surface slopes away from the first end of said first reflecting surface.

4. A light reflector as recited in claim 1 further comprising a third reflecting surface which intersects said first surface at the second end, said third reflecting surface sloping away from said first reflecting surface at a predetermined angle relative to the longitudinal axis of said first reflecting surface.

5. A light reflector as recited in claim 4 wherein said first reflecting surface is curved so as to form a cylindrical segment having a longitudinal axis that is parallel to the light source.

6. A light reflector as recited in claim 5 wherein and tapered so as to form conical segments which diverge as said second and third reflecting surfaces slope away from said first and second ends respectively of said first reflecting surface.

7. A light reflector for use with an elongated light source, said reflector comprising:
   a first reflecting surface formed to provide a desired light intensity distribution pattern in a first plane that intersects the elongated light source and said first reflecting surface and is perpendicular to a long axis of the light source, said first reflecting surface having a length between first and second ends, thereof in a direction which is parallel to said light source, and said length being shorter than a total length of the light source; and
   a second reflecting surface extending from one end of the first reflecting surface in a direction away from said light source and formed to provide a second desired light intensity distribution pattern in a second plane that is perpendicular to said first plane, intersects the elongated light source, and is parallel to a pair of straight lines on said second reflecting surface that are parallel to and equidistant from the light source.

8. A reflector as recited in claim 7 further comprising a third reflecting surface extending from the other end of the first reflecting surface and formed to provide a third desired light intensity distribution pattern in the second plane.

9. A reflector as recited in claim 8 wherein said second and third reflecting surfaces are curved and tapered so as to form conical segments which diverge as said second and third reflecting surfaces slope away from said first and second ends respectively of said first reflecting surface.

10. A reflector as recited in claim 7 wherein said first reflecting surface is curved so as to form a cylindrical segment having a longitudinal axis that is parallel to the light source.

11. A reflector as recited in claim 10 wherein said second reflecting surface is curved and tapered so as to form a conical segment which diverges as said second reflecting surface slopes away from the end of said first reflecting surface.

12. A reflector as recited in claim 9 wherein said first reflecting surface has a circular curvature.

13. A reflector as recited in claim 9 wherein said first reflecting surface has an elliptical curvature.

14. A light reflector for providing a desired light intensity distribution from an elongated light source, said reflector comprising:
a first reflecting surface having first and second ends, a longitudinal axis extendign between said ends parallel to the light source and a length along said axis and between said ends that is shorter than a total length of the light source;
a second reflecting surface which intersects said first surface at one end thereof, said second surface sloping away from said first surface and said light source at a predetermined angle relative to the longitudinal axis of said first surface;
a third reflecting surface which intersects said first surface at the second end thereof, said third reflecting surface sloping away from said first reflecting surface and said light source at a predetermined angle relative to the longitudinal axis of said first reflecting surface; and
a base for supporting said first, second, and third reflecting surfaces 15. A light reflector as recited in claim 14 wherein said first reflecting surface is curved so as to form a cylindrical segment having a longitudinal axis that is parallel to the light source.

16. A light reflector as recited in claim 15 wherein said second and third reflecting surfaces are curved and tapered so as to form conical segments which diverge as said second and third reflecting surfaces slope away from said first and second ends.

* * * * *